(12) United States Patent
Fowe et al.

(10) Patent No.: US 11,480,439 B2
(45) Date of Patent: *Oct. 25, 2022

(54) METHOD, APPARATUS, AND COMPUTER PROGRAM PRODUCT FOR TRAFFIC OPTIMIZED ROUTING

(71) Applicant: HERE GLOBAL B.V., Eindhoven (NL)

(72) Inventors: James Fowe, Chicago, IL (US); Filippo Pellolio, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 321 days.

This patent is subject to a terminal disclaimer.

(21) Appl. No.: 16/745,466

(22) Filed: Jan. 17, 2020

(65) Prior Publication Data

US 2020/0149910 A1 May 14, 2020

Related U.S. Application Data

(63) Continuation of application No. 15/836,055, filed on Dec. 8, 2017, now Pat. No. 10,571,291.

(51) Int. Cl.
*G01C 21/00* (2006.01)
*G01C 21/34* (2006.01)
(Continued)

(52) U.S. Cl.
CPC ......... *G01C 21/3492* (2013.01); *G01C 21/32* (2013.01); *G01C 21/3446* (2013.01);
(Continued)

(58) Field of Classification Search
CPC ............... G01C 21/3492; G01C 21/32; G01C 21/3446; G01C 21/3617; G01C 21/3676;
(Continued)

(56) References Cited

U.S. PATENT DOCUMENTS 5,818,356 A 10/1998 Schuessler
8,660,789 B2 2/2014 Demiryurek et al.
(Continued)

FOREIGN PATENT DOCUMENTS

JP 2008-309665 12/2008

OTHER PUBLICATIONS

Chabini et al. "Adaptations of the A* Algorithm for the Computation of Fastest Paths in Deterministic Discrete-Time Dynamic Networks." IEEE Transations on Intelligent Transportation Systems, vol. 3, No. 1, Mar. 2002, pp. 60-74.
(Continued)

*Primary Examiner* — Yonel Beaulieu
(74) *Attorney, Agent, or Firm* — Alston & Bird LLP

(57) ABSTRACT

A method is provided to generate a route between an origin and a destination using historical travel times between segments of a road network map. Methods may include accessing a memory configured to store road network data segmented into tiles represented by quadkeys; determining a travel time between any two quadkeys of the stored road network data; receiving an origin and a destination within a road network corresponding to the road network data; calculating a route between the origin and the destination using the travel time between quadkeys that can be traversed from the origin to the destination; generating route guidance for the route between the origin and the destination; and providing the route guidance to a user indicating the route between the origin and the destination. The travel time between any two quadkeys may be determined based on historical travel times between the respective two quadkeys.

20 Claims, 6 Drawing Sheets

(51) Int. Cl.
*G06F 16/29* (2019.01)
*G01C 21/32* (2006.01)
*G01C 21/36* (2006.01)

(52) U.S. Cl.
CPC ..... *G01C 21/3617* (2013.01); *G01C 21/3676* (2013.01); *G01C 21/3694* (2013.01); *G06F 16/29* (2019.01)

(58) Field of Classification Search
CPC .... G01C 21/3694; G01C 21/10; G01C 21/16; G01C 21/34; G01C 21/00; G06F 16/29
See application file for complete search history.

(56) References Cited

U.S. PATENT DOCUMENTS

| | | | |
|---|---|---|---|
| 8,831,637 B2 | 9/2014 | Stopel et al. | |
| 9,175,972 B2 | 11/2015 | Geisberger | |
| 9,933,548 B1* | 4/2018 | Stenneth | G08B 27/006 |
| 9,984,494 B2 | 5/2018 | Pylvaenaeinen et al. | |
| 10,571,291 B2* | 2/2020 | Fowe | G01C 21/3676 |
| 2003/0195694 A1 | 10/2003 | Kozak et al. | |
| 2008/0065318 A1 | 3/2008 | Ho | |
| 2009/0043486 A1 | 2/2009 | Yang et al. | |
| 2009/0326797 A1 | 12/2009 | Tengler et al. | |
| 2011/0208429 A1 | 8/2011 | Zheng et al. | |
| 2013/0006525 A1* | 1/2013 | Stroila | G01C 21/20 701/434 |
| 2013/0065613 A1 | 3/2013 | Stopel et al. | |
| 2015/0168170 A1 | 6/2015 | Schilling et al. | |
| 2015/0223201 A1 | 8/2015 | Joshi et al. | |
| 2015/0317649 A1 | 11/2015 | Joshi et al. | |
| 2016/0232420 A1 | 8/2016 | Fan et al. | |
| 2017/0102700 A1 | 4/2017 | Kozak | |
| 2017/0314935 A1 | 11/2017 | Vakharia | |
| 2018/0276875 A1 | 9/2018 | Pylvaenaeinen et al. | |
| 2019/0049256 A1 | 2/2019 | Camp et al. | |
| 2020/0192356 A1* | 6/2020 | Stenneth | G08G 1/09675 |
| 2021/0341300 A1* | 11/2021 | Beaurepaire | G01C 21/3446 |
| 2021/0389152 A1* | 12/2021 | Beaurepaire | G06F 3/04815 |

OTHER PUBLICATIONS

European Search Report for Application No. EP 18210887.8 dated May 13, 2019, 13 pages.
Extended European Search Report for European Application No. 18210887.8 dated Jul. 17, 2019.
Nyamweya, Okioga Edgar. "Automated Route Selection: Short Term Traffic Decision Support for Nairobi." Submitted in partial fulfillment of the requirements of the Master of Science in Information Systems, University of Nairobi School of Computing and Informatics, Jun. 2006, 214 pages.
Office Action for U.S. Appl. No. 15/836,055 dated May 17, 2019.
Pui Hang Li et al. "Historical Traffic-tolerant Paths in Road Networks." SIGSPATIAL '14: Proceedings of the 22nd ACM SIGSPATIAL International Conference on Advances in Geographic Information Systems: Nov. 4-7, 2014, 4 pages.
Wen et al. "A route navigation system with a new revised shortest path routing algorithm and its performance evaluation." WIT Transactions on the Built Environment (Urban Transport), vol. 77, 2005; pp. 733-743.
Notice of Allowance for U.S. Appl. No. 15/836,055 dated Oct. 17, 2019.
Office Action for European Application No. 18210887.8 dated Jun. 2, 2021, 12 pages.
U.S. Appl. No. 15/836,055, filed Dec. 8, 2017, 2019/0178667 A1, Allowed.

* cited by examiner

METHOD, APPARATUS, AND COMPUTER PROGRAM PRODUCT FOR TRAFFIC OPTIMIZED ROUTING

CROSS-REFERENCE TO RELATED APPLICATIONS

This application is a continuation of and claims priority to U.S. patent application Ser. No. 15/836,055 know U.S. Pat. No. 10,571,291 B2), filed on Dec. 8, 2017, the contents of which are herein incorporated by reference in their entirety.

TECHNOLOGICAL FIELD

An example embodiment of the present invention relates to optimizing path-finding algorithms for route navigation and more particularly, to traffic optimized routing using heuristics of greater accuracy to improve efficiency and accuracy of the routing.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Traffic data that is provided on digital maps is generally based on crowd-sourced data from mobile devices or probe data. The traffic data is typically reflective of a collective group of mobile devices traveling along a road segment, and may be useful in vehicle navigation applications in order for a user to avoid heavy traffic routes between an origin and a destination. However, dynamic computation of route optimization is computationally intensive and limited based on available processing power and the resultant periodic updates that can be processed.

BRIEF SUMMARY

A method, apparatus, and computer program product are provided in accordance with an example embodiment for efficiently generating a route between an origin and a destination using the historical journey time between various segments of the road map network. An example embodiment provides a map services provider including a memory configured to store road network data segmented into tiles represented by quadkeys. The system further includes processing circuitry configured to: determine a travel time between any two quadkeys of the stored road network data; receive an origin and a destination within a road network corresponding to the road network data; calculate a route between the origin and the destination using the travel time between quadkeys that can be traversed from the origin to the destination; generate route guidance for the route between the origin and the destination; and provide the route guidance to a user indicating the route between the origin and the destination. The route guidance may be provided to a user through a user interface of a personal navigation device. The travel time between any two quadkeys may be determined based on historical travel times between the two respective quadkeys.

According to some embodiments, the calculation of a route between the origin and the destination may be performed for a given context, where the travel time between any two quadkeys may be further determined based on historical travel times between the respective two quadkeys at a similar context to the given context. The given context may include one or more of time of day, day of week, month of year, season of year, special event occurrence, weather, or the like. The processing circuitry configured to calculate the route between the origin and the destination using the travel time between quadkeys may optionally include processing circuitry configured to: calculate a first portion of the route in accordance with a first criteria; calculate a second portion of the route in accordance with a second criteria, different from the first criteria; and compile the first portion of the route and the second portion of the route to form the route.

The processing circuitry configured to calculate the route between the origin and the destination using the travel time between quadkeys may optionally include processing circuitry configured to: calculate a first portion of the route using an A-star algorithm; calculate a second portion of the route using the travel time between quadkeys between the origin and the destination; and compile the first portion of the route and the second portion of the route to form the route. The processing circuitry configured to calculate a first portion of the route using an A-star algorithm may be performed in response to quadkeys not being available for a portion of the route corresponding to the first portion. The processing circuitry configured to calculate the first portion of the route using an A-star algorithm is performed in response to the first portion of the route being at least a first distance away from the destination.

Embodiments described herein may provide an apparatus including at least one processor and at least one memory including computer program code. The at least one memory and the computer program code configured to, with the processor, cause the apparatus to at least: access a memory configured to store road network data segmented into tiles represented by quadkeys; determine a travel time between any two quadkeys of the stored road network data; receive an origin and a destination within a road network corresponding to the road network data; calculate a route between the origin and the destination using the travel time between quadkeys that can be traversed from the origin to the destination; generate route guidance for the route between the origin and the destination; and provide the route guidance to a user indicating the route between the origin and the destination. The route guidance may be provided to a user through a user interface of a personal navigation device.

According to some embodiments, the travel time between any two quadkeys may be determined based on historical travel time between the respective two quadkeys. The calculation of a route between the origin and the destination may be performed for a given context, where the travel time between any two quadkeys may be further determined based on historical travel times between the respective two quadkeys at a similar context to the given context. The given context may include at least one of time of day, day of week, month of year, season of year, special event occurrence, weather, or the like. Causing the apparatus to calculate the route between the origin and the destination using the travel time between quadkeys may optionally include causing the apparatus to: calculate a first portion of the route in accordance with a first criteria; calculate a second portion of the route in accordance with a second criteria, different from the first criteria; and compile the first portion of the route and the second portion of the route to form the route.

According to some embodiments, causing the apparatus to calculate the route between the origin and the destination using the travel time between quadkeys may optionally include causing the apparatus to: calculate a first portion of the route using an A-star algorithm; calculate a second portion of the route using the travel time between quadkeys between the origin and the destination; and compile the first portion of the route and the second portion of the route to form the route. Causing the apparatus to calculate the first portion of the route using the A-star algorithm is performed in response to quadkeys not being available for a portion of the route corresponding to the first portion. Causing the apparatus to calculate the first portion of the route using the A-star algorithm is performed in response to the first portion of the route being at least a first distance away from the destination.

Embodiments described herein may provide a method including: accessing a memory configured to store road network data segmented into tiles represented by quadkeys; determining a travel time between any two quadkeys of the stored road network data; receiving an origin and a destination within a road network corresponding to the road network data; calculating a route between the origin and the destination using the travel time between quadkeys that can be traversed from the origin to the destination; generating a route guidance for the route between the origin and the destination; and providing the route guidance to a user indicating the route between the origin and the destination. The travel time between any two quadkeys may be determined based on historical travel times between the respective two quadkeys.

Embodiments described herein may provide an apparatus including: means for accessing a memory configured to store road network data segmented into tiles represented by quadkeys; means for determining a travel time between any two quadkeys of the stored road network data; means for receiving an origin and a destination within a road network corresponding to the road network data; means for calculating a route between the origin and the destination using the travel time between quadkeys that can be traversed from the origin to the destination; means for generating route guidance for the route between the origin and the destination; and means for providing the route guidance to a user indicating the route between the origin and the destination. The travel time between any two quadkeys may be determined based on historical travel times between the respective two quadkeys.

BRIEF DESCRIPTION OF THE DRAWINGS

Figure 1:
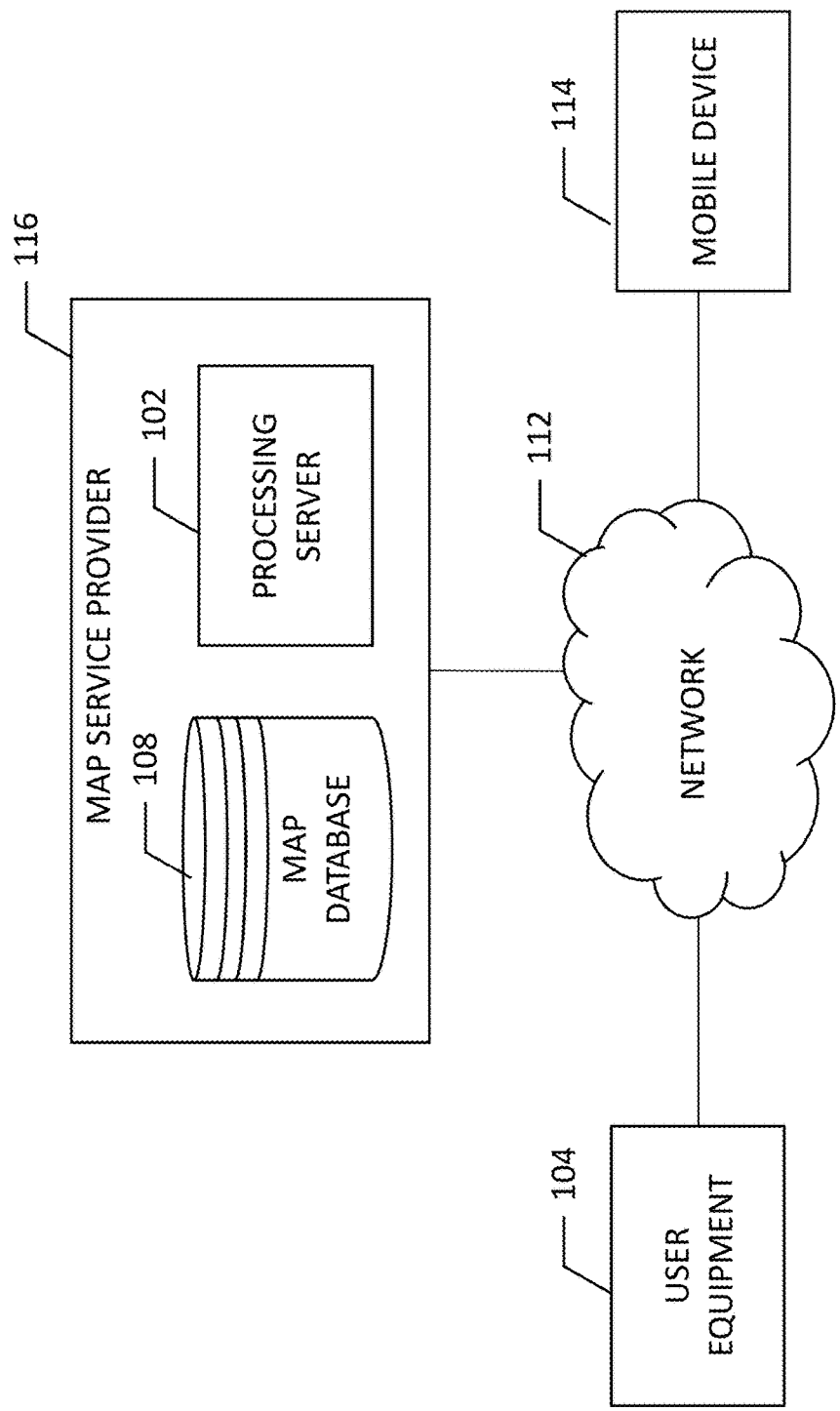
Figure 2:
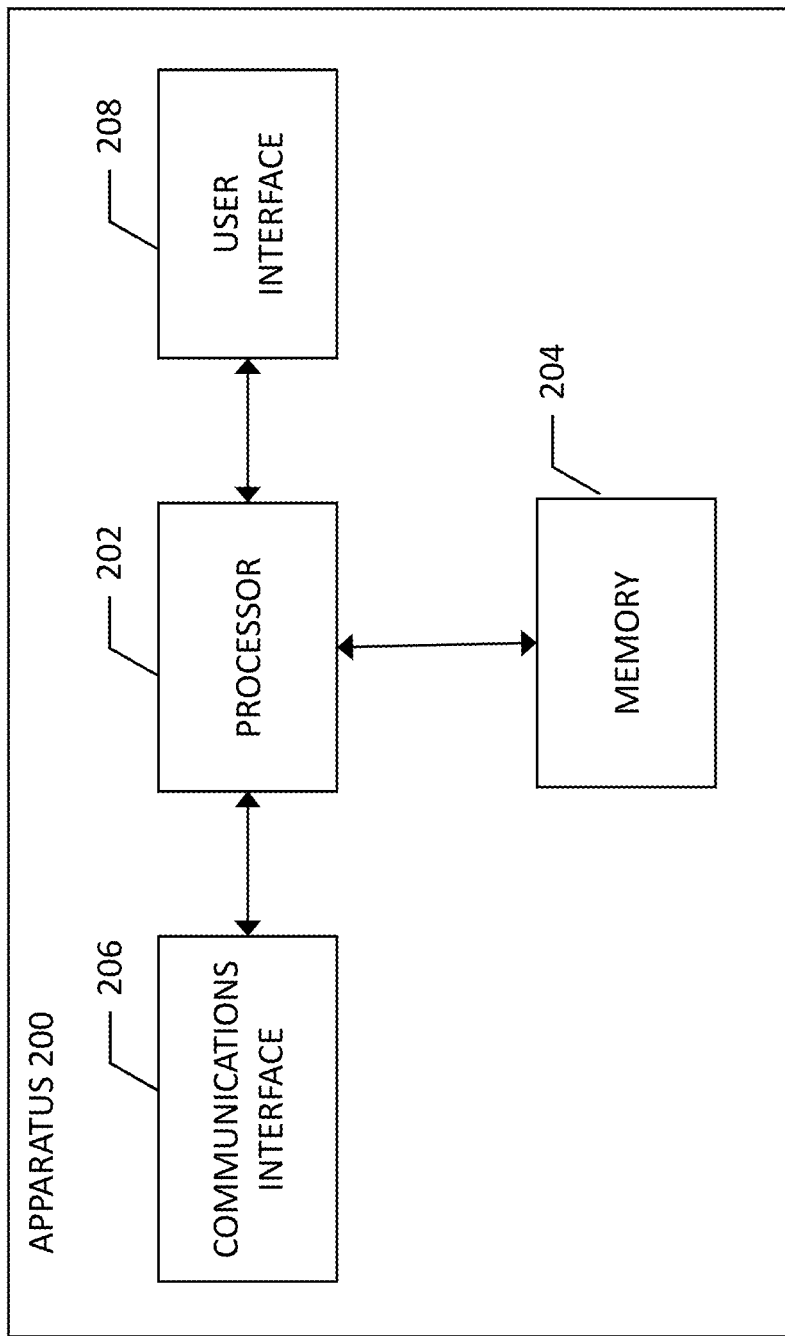
Figure 3:
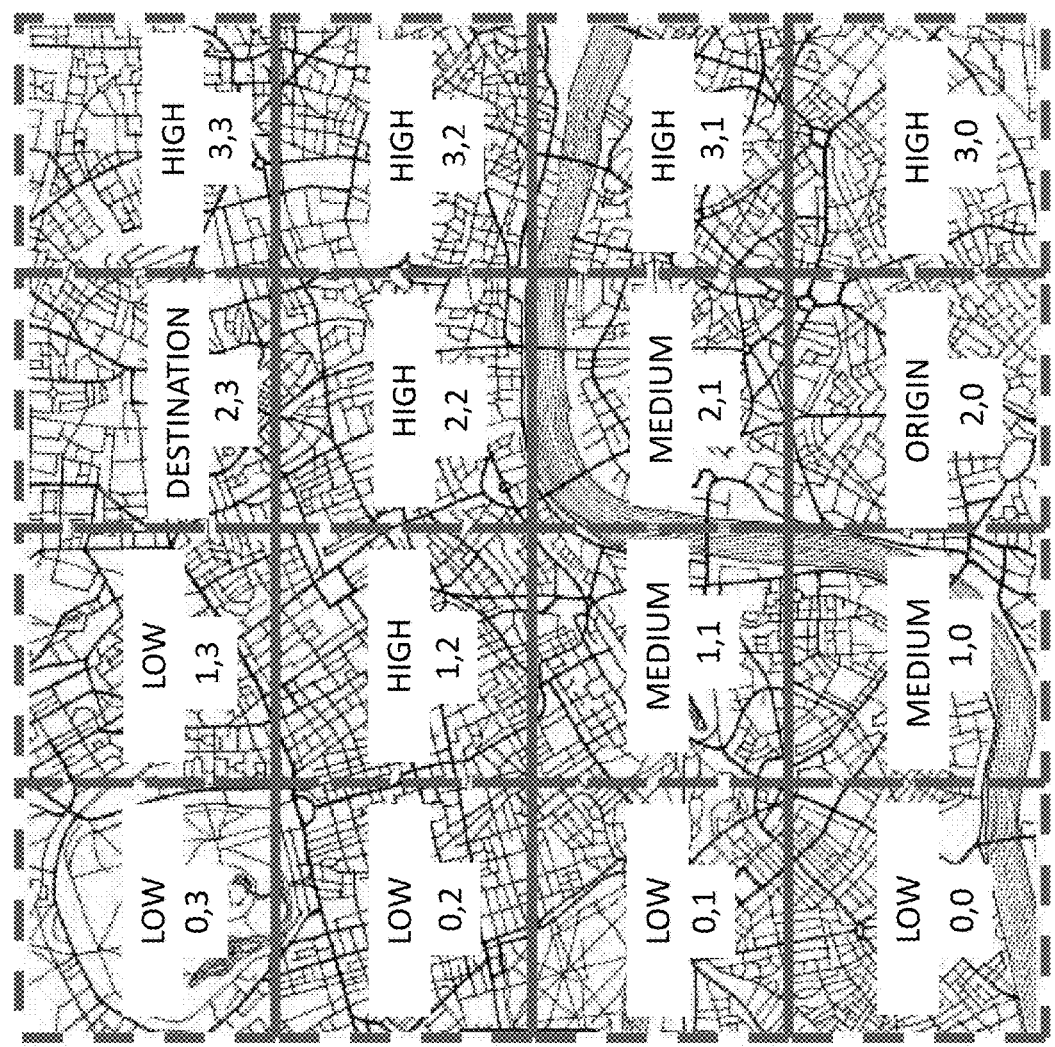
Figure 4:
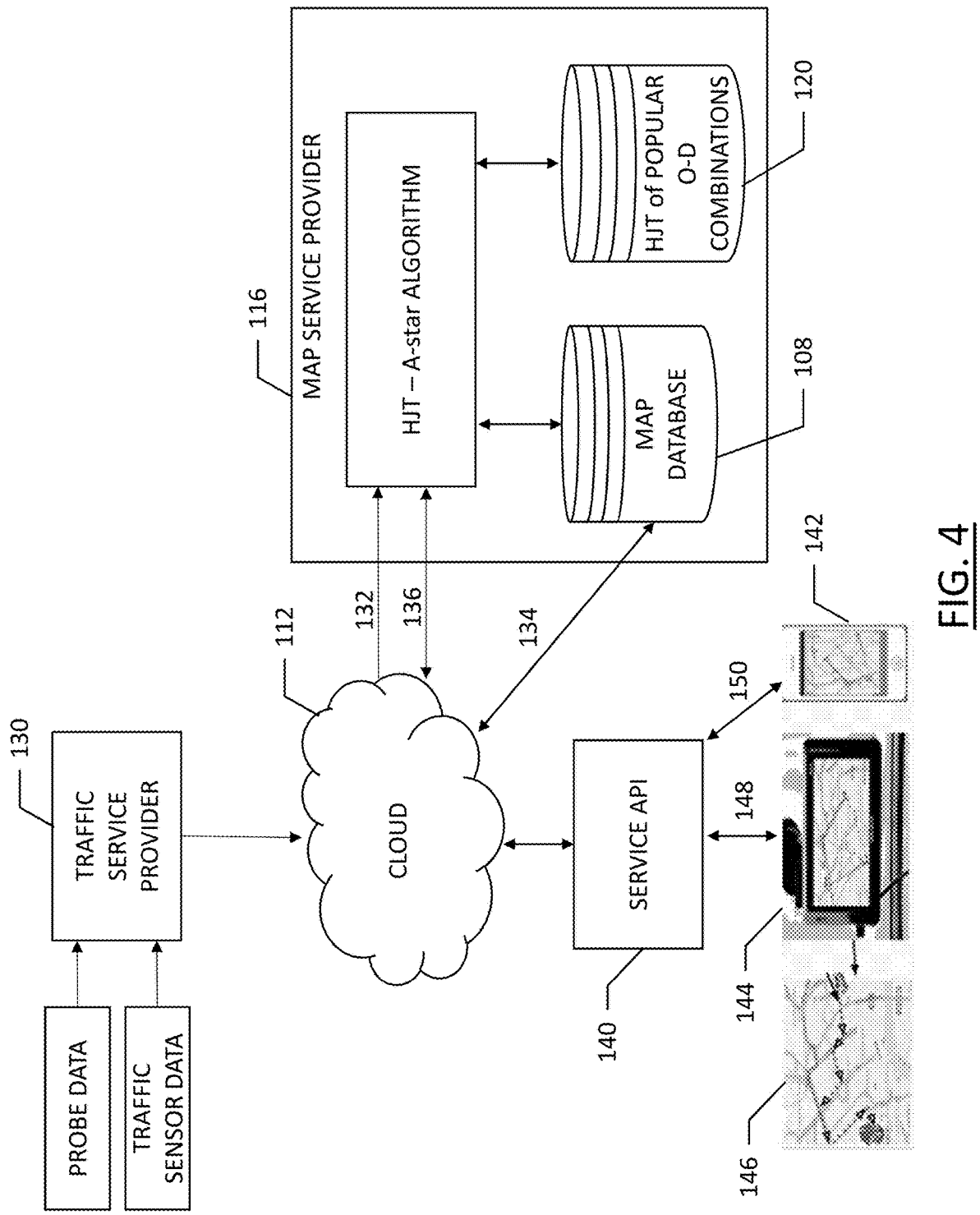
Figure 5:
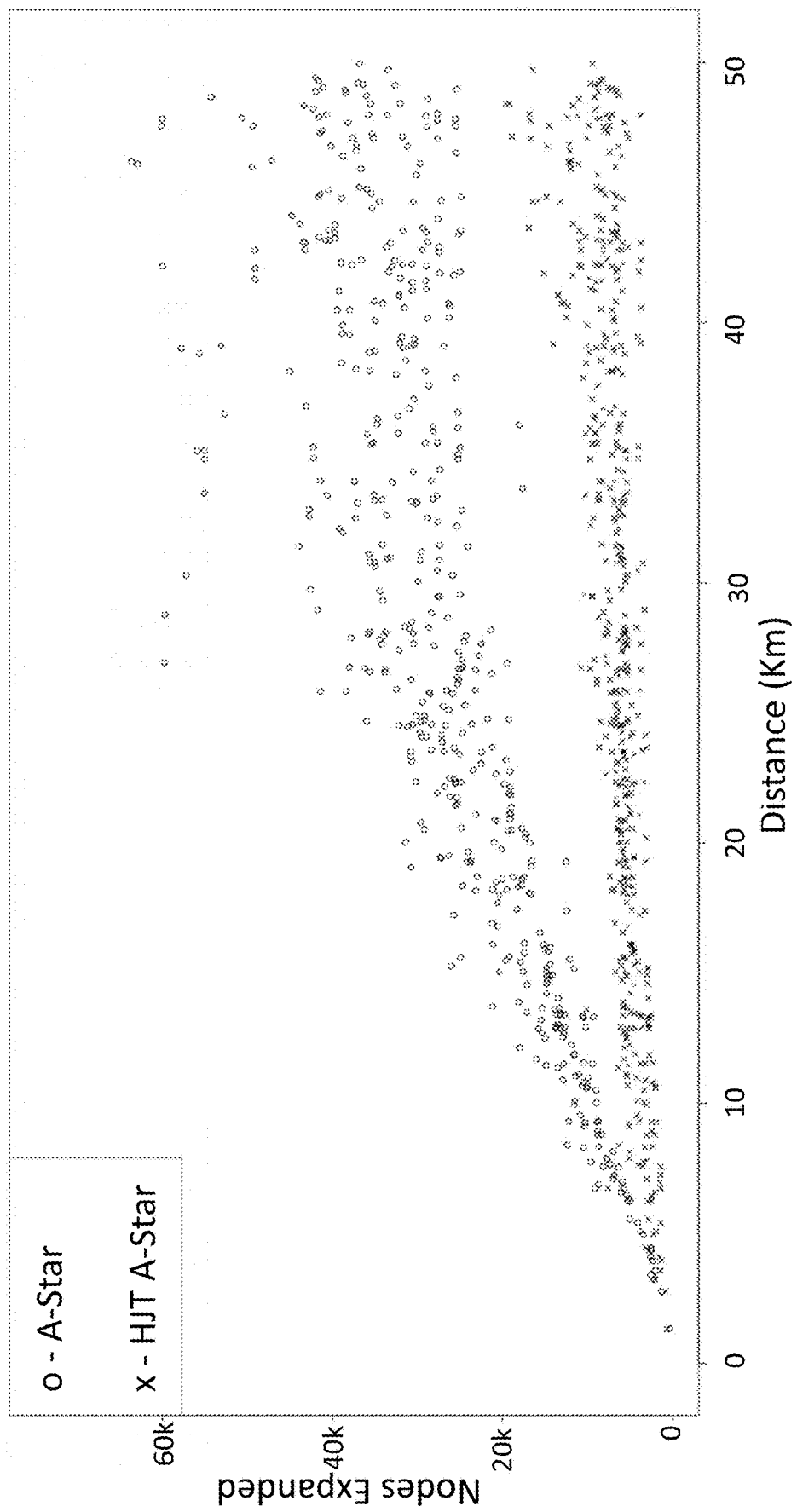
Figure 6:
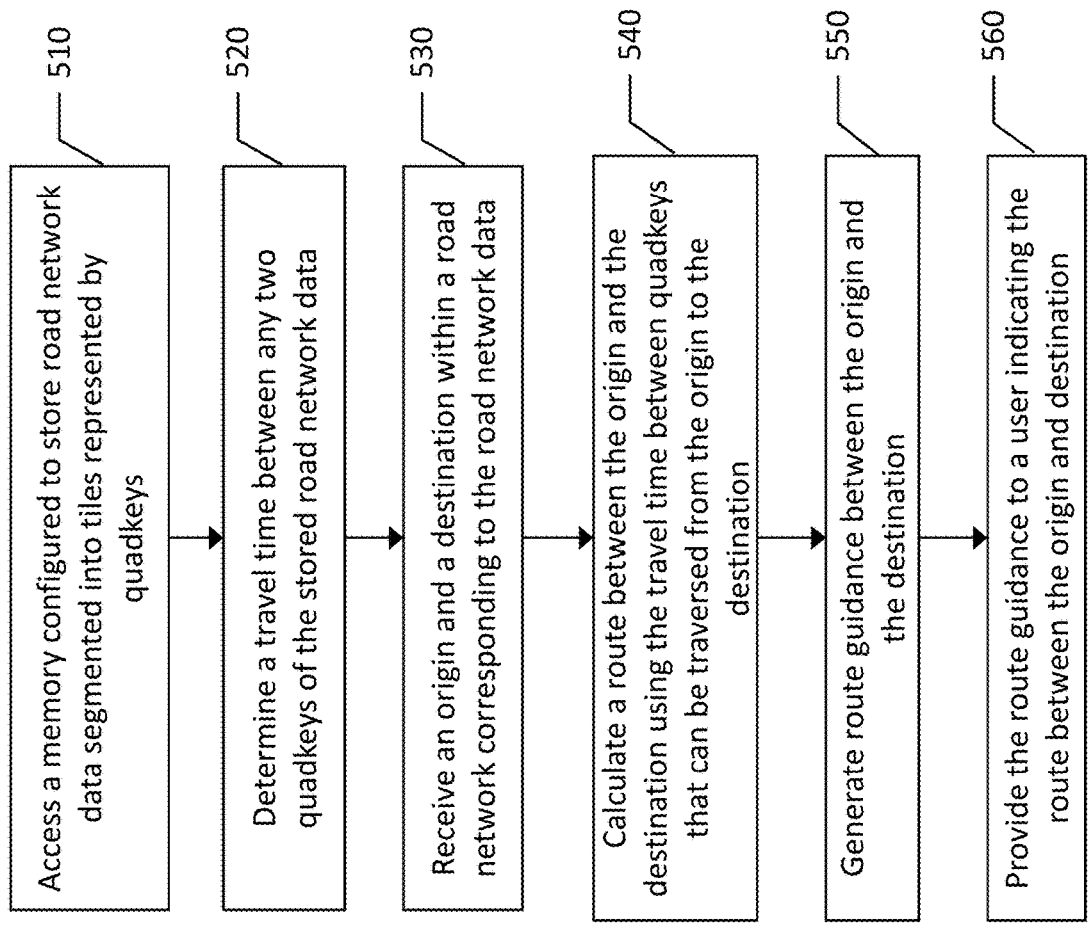

Having thus described example embodiments of the invention in general terms, reference will now be made to the accompanying drawings, which are not necessarily drawn to scale, and wherein:

FIG. 1 illustrates a communications diagram in accordance with an example embodiment;

FIG. 2 is a block diagram of an apparatus that may be specifically configured for establishing a route using map tiles identified by quadkeys in accordance with an example embodiment described herein;

FIG. 3 illustrates a depiction of a road network map segmented into tiles represented by quadkeys according to an example embodiment described herein;

FIG. 4 illustrates a block diagram of a system that may be specifically configured for establishing a route using map tiles identified by quadkeys in accordance with an example embodiment described herein;

FIG. 5 illustrates a plot of routes generated by the A-star algorithm and by the HJT heuristic plotted according to a distance between origin and destination and a number of nodes expanded; and FIG. 6 is a flowchart of a method for establishing a route from an origin to a destination using map tiles identified by quadkeys according an example embodiment described herein.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus, and computer program product are provided herein in accordance with an example embodiment for more efficiently and effectively establishing a route between an origin and a destination using historical minimum travel time between tiles of a road network map represented by quadkeys into which a network of roads is divided. This technique provides an admissible heuristic that does not overestimate travel time. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and a network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. Further, the map database may segment a network of roadways into a plurality of tiles identified by quadkeys, each quadkey representing a tile or portion of the network of roadways. The quadkeys may represent an area of the network of roads including a plurality of road segments, and the area represented by the quadkeys may be scalable from a small, highly granular size, to a large size potentially encompassing a plurality of road segments, nodes, and the like. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) also known as a context associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

In an example embodiment, the geographic map database 108 may be presented according to a hierarchical or multi-level tile projection. More specifically, the geographic database may be defined according to a normalized Mercator projection or another type of projection. A map tile grid of a Mercator or similar projection may be a multilevel grid, dividing the map into a plurality of map tiles identified by quadkeys. Each cell or tile, corresponding to a unique quadkey, in a level of the map tile grid may be divisible into the same number of tiles of that same level of grid. In other words, the initial level of the map tile grid (e.g., a level at the lowest level of zoom) may be divisible into four cells or rectangles. Each of those cells may be, in turn, divisible into four cells, and so on until the highest level of zoom of the projection is reached.

According to an example embodiment, the map tile grid may be numbered in a systematic fashion to define a tile identifier (tile ID). For example, the top left tile may be numbered "00", the top right tile may be numbered "01", the bottom left tile may be numbered "10", and the bottom right tile may be numbered "11". In one embodiment, each cell may be divided into four rectangles and numbered by concatenating the parent tile ID and the new tile position. A variety of numbering schemes may also be possible. Any number of levels within increasingly smaller geographic areas may represent the map tile grid. Any level (n) of the map tile grid may have $4^{\wedge}(n)$ cells or $2^{\wedge}(2n)$ cells. Accordingly, any tile of the level (n) has a geographic area of $A/4^{\wedge}(n)$ or $A/2^{\wedge}(2n)$, where A is the total geographic area of the world or the total area of the map tile grids. Using the aforementioned numbering system or a similar nomenclature, the exact position of any tile in any level of the map tile grid or projection may be uniquely determined from the tile ID.

According to some embodiments, the system may identify a tile by a quadkey determined based on the ID of a tile of the map tile grid. The quadkey, for example, may be a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeros may be inserted or retained regardless of the level of the map tile grid in order to maintain a constant length for the one-dimensional array of the quadkey. In another example, the length of the one-dimensional array of the quadkey may indicate the corresponding level within the map tile grid. In one embodiment, the quadkey may be an example of the hash or encoding scheme of the respective geographical coordinates of a geographical data point that can be used to identify a tile in which the geographic data point is located.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map services provider. For example, a customer of the map services provider, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In one embodiment, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as a digital routing and map display. An end user can use the user equipment 104 for navigation and map functions such as guidance and map display, for example, and for determination of one or more personalized routes or route segments based on one or more calculated and recorded routes, according to some example embodiments.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114, a navigation system or a navigation device are examples of devices that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present invention for efficient and effective route generation from an origin to a destination. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments of the present invention provide a mechanism for route generation that minimizes travel time between an origin and a destination and may consider real-time traffic in generating and updating the route. Provided herein is a new heuristic to supplement and enhance the A-star algorithm (also denoted A*) currently used in route generation. The A-star algorithm is flawed as travel time between any two points on a map cannot be easily estimated and it should never be over estimated. Conventionally, the heuristic used is the displacement divided by the maximum speed on the road network. This estimation may substantially underestimate the travel time between two points, leading to the exploration of many unnecessary nodes during the computation of the A-star algorithm. This occurs as the heuristic pre-supposes that the best route between two points is a straight line between them, which is not always the case in a road network.

Embodiments described herein use historical journey time data to estimate travel time between two points, where the two points are generalized and identified by quadkeys representing tiles of a map of a road network. This method allows the algorithm to take the road network into consideration gathering probe data or other traffic-based data for vehicles that have previously traversed the road network. While historical data is significant, storing the travel time between all combinations of two points (e.g., nodes, road segments, POIs, etc.) is unfeasible, embodiments described herein can substantially reduce the amount of storage needed while still capitalizing on historical journey time. Rather than determining historical journey times between any two individual points, the historical journey time between map tiles represented by quadkeys are established. As the tiles (and representative quadkeys) are scalable, the artifact, or database of historical journey times between quadkeys, will grow or shrink in size with a factor of sixteen for every level of detail added or removed.

According to example embodiments described herein, the historical minimum travel time between any two quadkeys (and underlying tiles) is stored and used as a heuristic for the travel time between any two points contained in the respective quadkeys. This generalizes the origin and destination to provide a reliable, reasonably accurate estimation of the travel time between the origin and destination, without specifically referencing historical journey time between the origin and destination points. Provided enough historical journey time exists between quadkeys at the desired level of scale, the method described herein is an admissible heuristic meaning that it will not overestimate the cost (e.g., time) to reach the goal (e.g., destination). The admissibility of the heuristic is meaningful as it means that the A-star algorithm computed using the HJT heuristic between quakdeys will produce improved results, such as an optimal result. consistently.

FIG. 3 illustrates an example embodiment in which the A-star algorithm would reach a result in an unsatisfactory and inefficient manner, while employing embodiments described herein using a historical journey time heuristic between quadkeys will reach an optimal result more quickly and efficiently, providing the most efficient route between the origin and the destination. In the illustrated figure, the map is divided into tiles identified by quadkeys and shown with coordinate locations for reference. Further, the historical journey time for each quadkey is shown to illustrate the time it takes to traverse the respective quadkey. The identifier "low" indicates a low time to traverse a quadkey, while "high" represents a substantially longer time to traverse the associated quadkey. As shown, the origin is at quadkey location (2,0), while the destination is at quadkey location (2,3). The A-star algorithm would produce a result that passes through quadkey (2,1) and quadkey (2,2). However, quadkey (2,2) has a high associated historical journey time. Embodiments described herein would consider the historical journey time along all paths between the origin and destination in an efficient manner by referencing the historical journey times for each of the quadkeys that can be traversed, that is, are traversable, between the origin and destination. In the example embodiment of FIG. 3, the fastest, most efficient journey may be from the origin at (2,0), through quadkeys (1,0), (0,0), (0,1), (0,2), (0,3), (1,3), to destination quadkey (2,3). Thus, embodiments described herein may generate a route through roadways of those quadkeys to connect the origin to the destination, and provide route guidance information for that route to a user.

As shown in FIG. 3, exploring the nodes close to a straight line between the origin and destination, which can lead to a suboptimal route, while the heuristic proposed herein based on historical journey time would instead lead the algorithm to the optimal route quickly (e.g., exploring few nodes and paths) and consume substantially less processing capacity. Example embodiments described herein increase the amount of memory used by the map services provider 116 by storing historical journey time between quadkeys; however, this is compensated for by reducing the processing time needed to establish the most optimal route. One mechanism through which the required memory may be reduced is by reducing the level of detail when further away from the destination quadkey. A high level of detail may be retained in quadkeys surrounding the destination and the detail level can be gradually reduced as the distance from the destination quadkey increases.

Another mechanism through with the required storage of historical journey times for quadkeys can improve route selection and guidance is to compute the artifact or database of historical journey times according to the most probable destination quadkeys, while relying on a more conventional A-star algorithm for other cases. Most routing requests may be concentrated inside or close to major cities, where traffic-optimization is generally more important, so the artifact may be built only for quadkeys falling within the major city or within a predefined distance of the major city.

FIG. 4 provides another example embodiment of a communication diagram that includes a map services provider system 116 as in FIG. 1, including a map database 108, but further includes a historical journey time (HJT) database 120. The HJT database 120 may include the historical journey times between map tiles represented by quadkeys between popular origins and destinations. It is not feasible to determine historical journey times for all origin-destination pairs, but using popular origin-destination historical journey times can function as a cache to assist in the determination of routes and times associated therewith for routes that include at least a portion of a popular origin-destination pair. The map services provider 116 may receive real-time traffic data including reports of incidents and travel times from traffic service provider 130, which may receive data from municipal transportation departments (e.g., traffic cameras, sensors, etc.) or from probe data as described above.

The map service provider 116 may receive real-time traffic updates along 132, and dynamic map updates may occur between the network 112 and the map database 108 along 134. The service application program interface 140 may provide an interface between user devices, such as smart phones 142 or personal navigation devices 144, while receiving routing requests for different origin-destination combinations. The personal navigation device 144 (and/or smart phone 142) may present to a user navigation assistance in the form of route guidance 146. Route requests between the different origin-destination pairs may be received at the map service provider 116 along 136.

Storing the historical journey time between every pair of points in a map system is unfeasible and saving between road segment pairs is also unfeasible as there are approximately 60 million road segments in North America. Further, storing historical journey times in a database 120, even for a limited number of popular origin-destination pairs may be unfeasible to be stored on a mobile device requesting a route, such that it may be stored in database 120 on map service provider 116. However, the increased computational speed of algorithms presented herein results in a low request time latency on the map service provider side. The map service provider may store a greater amount of historical journey times than feasible on a portable device, but based on the improvements in processing efficiency described herein, the request time may be considerably lower than existing methods. According to the illustrated embodiment of FIG. 4, a cloud architecture may be used for traffic-aware routing as it may require an internet connection to keep fetching real-time traffic updates from a remote backend server. The historical journey time (HJT) heuristic parameter needed by the routing system for each origin-destination route request is fetched in the cloud from the HJT artifact in the database. Through the same network connection, the map updates may be fetched by PNDs, mobile applications, and various in-car embedded systems. The architecture suits traffic-aware routing and can improve upon an existing A-star algorithm application. Embodiments can optimize an A-star algorithm application with a novel HJT heuristic for obtaining the appropriate HJT-per-quadkey during an A-star algorithm application to improve routing efficiency and reduce latency, while providing an accurate estimate of the travel time between the origin and destination.

According to some example embodiments described herein, the historical journey time per quadkey may optionally include a context component. Context may include time of day, day of week, season of year, month of year, special event occurrence, weather, etc. For example, travel time through a tile associated with a quadkey may increase substantially when it is raining. As such, the historical journey time for that quadkey may be substantially higher during rain, and substantially lower during non-inclement weather. Thus, while adding a layer of complexity to the HJT-per-quadkey artifact, the accuracy of historical journey times between an origin and a destination may be improved when a context is considered, such as by determining the travel time between quadkeys based on historical travel times between the quadkeys at a similar context, such as the same context or a context within a predefined range, to the given contect.

Example embodiments described herein were tested around two major cities, including Chicago, Ill. in the United States, and Berlin in Germany. Thousands of random requests in the area covered by the respective artifacts were generated and a route was established using both the conventional A-star algorithm (denoted A*) which uses displacement distance as the heuristic and another A-star with the above-described HJT heuristic (denoted H*). FIG. 5 illustrates the results of this testing, where each plotted point represents a route generated. The graph illustrates the distance between the origin and destination of each route along the x-axis labeled (Distance (Km)), while the number of nodes expanded or explored to reach the most efficient route is depicted on the x-axis labeled Nodes Expanded. The routes generated by the HJT heuristic are identified by an "x", while the routes generated by the A-star algorithm are identified by an "o". As illustrated, the results found that using the more efficient methods described herein, the number of nodes explored while establishing the best route was one third of that using the conventional A-star algorithm. While the tests were conducted without accounting for real-time traffic-optimization, the improvements were substantial. Further, including real-time traffic-optimization in the HJT heuristic method would improve the performance, further reducing the number of nodes explored before establishing the best route to a destination.

FIG. 6 illustrates a flowchart depicting a method according to example embodiments of the present invention. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 6 illustrates a flowchart of a method according to an example embodiment of the present invention for efficiently and accurately generating a route between an origin and a destination considering routes based on historical travel times within tiles into which a map of the region is divided. As shown, a memory configured to store road network data segmented into tiles represented by quadkeys is accessed at 510. A travel time between any two of the quadkeys of the stored road network data is determined at 520. An origin and a destination may be received at 530 in a request for a route. At 540, a route is calculated between the origin and the destination using the travel time between the quadkeys that can be traversed from the origin to the destination. Route guidance between the origin and the destination is generated at 550, and at 560, the route guidance from the origin to the destination is provided to a user.

In an example embodiment, an apparatus for performing the method of FIG. 6 above may comprise a processor (e.g., the processor 202) configured to perform some or each of the operations (510-560) described above. The processor may, for example, be configured to perform the operations (510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A map services provider system comprising:
a memory configured to store road network data segmented into tiles and travel time between pairs of tiles; and
processing circuitry configured to:
receive an origin and a destination within a road network corresponding to the road network data;
identify a tile corresponding to the origin and a tile corresponding to the destination;
calculate a route between the origin and the destination using the travel time between tiles that can be traversed from the origin to the destination; and
provide the route guidance to a user indicating the route between the origin and the destination.

2. The map services provider of claim 1, wherein the processing circuitry configured to calculate a route between the origin and the destination using the travel time between tiles that can be traversed from the origin to the destination comprises processing circuitry configured to:
explore sequences of tiles between the tile corresponding to the origin and the tile corresponding to the destination;
identify a sequence of tiles between the tile corresponding to the origin and the tile corresponding to the destination having the shortest travel time; and calculate a route traversing the tiles of the sequence of tiles between the tile corresponding to the origin and the tile corresponding to the destination having the shortest travel time.

3. The map services provider of claim 1, wherein the travel time between any two tiles is determined based on historical travel times between the respective two tiles.

4. The map services provider of claim 3, wherein the calculation of a route between the origin and the destination is performed for a given context, wherein the travel time between any two tiles is further determined based on historical travel times between the respective two tiles at a similar context to the given context.

5. The map services provider of claim 4, wherein the given context comprises at least one of time of day, day of week, month of year, season of year, special event occurrence, or weather.

6. The map services provider of claim 1, wherein the processing circuitry configured to calculate the route between the origin and the destination using the travel time between tiles further comprises processing circuitry configured to:
calculate a first portion of the route using an A-star algorithm;
calculate a second portion of the route using the travel time between tiles between the origin and destination; and
compile the first portion of the route and the second portion of the route to form the route.

7. The map services provider of claim 1, wherein the processing circuitry is further configured to: generate route guidance for the route between the origin and the destination to be provided to the user.

8. An apparatus comprising at least one processor and at least one memory including computer program code, the at least one memory and computer program code configured to, with the processor, cause the apparatus to at least:
access a memory configured to store road network data segmented into tiles and travel time between pairs of tiles;
receive an origin and a destination within a road network corresponding to the road network data;
identify a tile corresponding to the origin and a tile corresponding to the destination;
calculate a route between the origin and the destination using the travel time between tiles that can be traversed from the origin to the destination; and
provide the route guidance to a user indicating the route between the origin and the destination.

9. The apparatus of claim 8, wherein causing the processor to calculate a route between the origin and the destination using the travel time between tiles that can be traversed from the origin to the destination comprises causing the apparatus to:
explore sequences of tiles between the tile corresponding to the origin and the tile corresponding to the destination;
identify a sequence of tiles between the tile corresponding to the origin and the tile corresponding to the destination having the shortest travel time; and
calculate a route traversing the tiles of the sequence of tiles between the tile corresponding to the origin and the tile corresponding to the destination having the shortest travel time.

10. The apparatus of claim 8, wherein the travel time between any two tiles is determined based on historical travel times between the respective two tiles.

11. The apparatus of claim 10, wherein the calculation of a route between the origin and the destination is performed for a given context, wherein the travel time between any two tiles is further determined based on historical travel times between the respective two tiles at a similar context to the given context.

12. The apparatus of claim 11, wherein the given context comprises at least one of time of day, day of week, month of year, season of year, special event occurrence, or weather.

13. The apparatus of claim 8, wherein causing the apparatus to calculate the route between the origin and the destination using the travel time between tiles further comprises causing the apparatus to:
calculate a first portion of the route using an A-star algorithm;
calculate a second portion of the route using the travel time between tiles between the origin and destination; and
compile the first portion of the route and the second portion of the route to form the route.

14. The apparatus of claim 8, wherein the apparatus is further caused to: generate route guidance for the route between the origin and the destination to be provided to the user.

15. A method comprising:
storing, in a database, road network data segmented into tiles and travel time between pairs of tiles;
receiving an origin and a destination within a road network corresponding to the road network data;
identifying a tile corresponding to the origin and a tile corresponding to the destination;
calculating a route between the origin and the destination using the travel time between tiles that can be traversed from the origin to the destination; and
providing the route guidance to a user indicating the route between the origin and the destination.

16. The method of claim 15, wherein calculating a route between the origin and the destination using the travel time between tiles that can be traversed from the origin to the destination comprises:
exploring sequences of tiles between the tile corresponding to the origin and the tile corresponding to the destination;
identifying a sequence of tiles between the tile corresponding to the origin and the tile corresponding to the destination having the shortest travel time; and
calculating a route traversing the tiles of the sequence of tiles between the tile corresponding to the origin and the tile corresponding to the destination having the shortest travel time.

17. The method of claim 15, wherein the travel time between any two tiles is determined based on historical travel times between the respective two tiles.

18. The method of claim 17, wherein the calculation of a route between the origin and the destination is performed for a given context, wherein the travel time between any two tiles is further determined based on historical travel times between the respective two tiles at a similar context to the given context.

19. The method of claim 18, wherein the given context comprises at least one of time of day, day of week, month of year, season of year, special event occurrence, or weather.

20. The method of claim 15, wherein calculating the route between the origin and the destination using the travel time between tiles further comprises:
calculating a first portion of the route using an A-star algorithm;

calculating a second portion of the route using the travel time between tiles between the origin and destination; and compiling the first portion of the route and the second portion of the route to form the route.

\* \* \* \* \*